(12) United States Patent
Ramanathan et al.

(10) Patent No.: US 12,368,640 B2
(45) Date of Patent: Jul. 22, 2025

(54) INTELLIGENT CHANGE WINDOW PLANNER

(71) Applicant: Cisco Technology, Inc., San Jose, CA (US)

(72) Inventors: Shankar Ramanathan, Allen, TX (US); Muhilan Natarajan, Allen, TX (US); Vishal Desai, San Jose, CA (US); Robert Edgar Barton, Richmond (CA); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 76 days.

(21) Appl. No.: 17/876,345

(22) Filed: Jul. 28, 2022

(65) Prior Publication Data
US 2024/0039786 A1 Feb. 1, 2024

(51) Int. Cl.
*H04L 41/082* (2022.01)
*G06F 40/279* (2020.01)
*H04L 41/0823* (2022.01)

(52) U.S. Cl.
CPC .......... *H04L 41/082* (2013.01); *G06F 40/279* (2020.01); *H04L 41/0836* (2013.01)

(58) Field of Classification Search
CPC .. H04L 41/082; H04L 41/0836; G06F 40/279
USPC ........................................................ 709/221
See application file for complete search history.

(56) References Cited

U.S. PATENT DOCUMENTS

| | | | |
|---|---|---|---|
| 9,262,146 B1* | 2/2016 | Gupta | G06F 16/957 |
| 11,159,387 B1* | 10/2021 | Klinger | H04L 41/22 |
| 11,290,325 B1 | 3/2022 | Kaluza et al. | |
| 2002/0112200 A1* | 8/2002 | Hines | G06F 8/66 |
| | | | 714/38.11 |
| 2007/0021116 A1* | 1/2007 | Okita | H04W 24/02 |
| | | | 455/560 |
| 2012/0254395 A1* | 10/2012 | Bonas | H04L 41/0836 |
| | | | 709/224 |
| 2016/0328427 A1* | 11/2016 | Gruener | G06F 16/24549 |
| 2018/0167277 A1 | 6/2018 | Mahimkar et al. | |
| 2020/0028738 A1* | 1/2020 | Killadi | H04L 43/062 |
| 2020/0244704 A1 | 7/2020 | Andrews | |
| 2020/0264919 A1 | 8/2020 | Vukovic et al. | |
| 2020/0336374 A1 | 10/2020 | Clark et al. | |
| 2021/0248001 A1* | 8/2021 | Duggirala | G06N 20/00 |
| 2021/0279111 A1 | 9/2021 | Ranjan | |

(Continued)

OTHER PUBLICATIONS

Dumitras Tudor, et al, "To upgrade or not to upgrade impact of online upgrades across multiple administrative domains", Human Factors in Computing Systems, Oct. 17, 2010, pp. 865-876.

(Continued)

*Primary Examiner* — Ario Etienne
*Assistant Examiner* — Kidest Mendaye
(74) *Attorney, Agent, or Firm* — Lee & Hayes, P.C.

(57) ABSTRACT

This disclosure describes techniques and mechanisms for determine a change window of least impact based on the type of activity, urgency, and preference, and highlighting risk(s) of choosing a change window. The techniques streamline and automate change window technology and provide customized and personalized change window option (s) to an administrator of a network.

20 Claims, 6 Drawing Sheets

(56) References Cited

U.S. PATENT DOCUMENTS

2021/0351973 A1 11/2021 Ford et al.
2021/0390187 A1* 12/2021 Ahmed .................. G06N 5/04

OTHER PUBLICATIONS

PCT Search Report and Written Opinion mailed Oct. 30, 2023 for PCT Application No. PCT/US2023/028803, "Intelligent Change Window Planner", 30 pages.

* cited by examiner

CHANGE WINDOW PLANNER 302

WHAT CHANGE WINDOW ARE YOU PLANNING TO IMPLEMENT? ← 304

☐ UPGRADE WLC(S) ← 306A

☐ UPGRADE AP(S) ← 306B

☐ CHANGE CONFIGURATION (TAGS, PROFILE, ETC.) ← 306N

WHEN DO YOU WANT TO IMPLEMENT THE CHANGE WINDOW? ← 308

☐ URGENT (UNDER 24 HOURS) ← 310A

☐ IMPORTANT (NEXT 24 HOURS) ← 310B

☐ MODERATE (THIS WEEK) ← 310C

☐ COSMETIC (NEXT WEEK) ← 310N

ADDITIONAL DETAILS AND USER PREFERENCES? ← 312

☐ AVOID LATE EVENING CHANGE WINDOWS (AFTER 6PM) ← 314A

☐ AVOID WEEKENDS ← 314B

☐ AVOID SPECIFIC APPLICATION TRAFFIC (AGVS, ← 314N
MEDICAL USE AR/VR HEADSETS, ETC.)

ADDITIONAL SETTINGS- EDIT AI PROFILE ← 316

BUSY HOURS ← 318

START TIME     END TIME
23:00          6:00

BUSY HOUR SENSITIIVITY ← 320

☐ LOW    ☐ MEDIUM    ☐ HIGH

[ SUBMIT 322 ]

CHANGE WINDOW PLANNER 302

RESULT ← 324

BASED ON YOUR SELECTION, THE BEST TIME WINDOWS OF LEAST IMPART TO UPGRADE YOUR WLC AND AP INVENTORY ARE:

☐ JANUARY 19, 2022 BETWEEN 1:45PM CT TO 3:45PM CT, 'WEBEX' IMPACTED, 12 TO 16 USER(S) ← 326A

☐ JANUARY 19, 2022 BETWEEN 10:45AM CT TO 12:45PM CT, 'ORACLE' IMPACTED, 22 TO 36 USER(S) ← 326B

☐ OTHER- ENTER DAY AND TIME FOR UPGRADE ← 326N

NOTE, YOU MAY HAVE TO INFORM USER(S) OF THAT AN APPLICATION MAY NOT BE OPERATIONAL ← 328

INTELLIGENT CHANGE WINDOW PLANNER

TECHNICAL FIELD

The present disclosure relates generally to the field of computer networking, and more particularly to providing an intelligent change window planner within enterprise networks.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of service networks, such as Local-Area Networks (LANs) that are in one physical location such as a building, Wide-Area Networks (WANs) that extend over a large geographic area to connect individual users or LANs, Enterprise Networks that are built for a large organization, Internet Threat and compliance data provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Enterprise networks generally use a change window concept, where an outage is communicated back to user(s) and an upgrade is planned. Network administrators may schedule a change window for a variety of reasons (e.g., software upgrade(s), configuration change(s) in the network, hardware update(s) in the network, etc.). Currently, change windows usually happen during weekends, holidays, late at night, etc., which require the network administrator to be present and/or online to implement the change window. However, change windows may not require a long period of time to implement, making these hours inconvenient.

Moreover, while solutions (e.g., SMU, Hotpatch, rolling AP upgrades etc.) exist that help reduce the software update downtime in a network, network administrators still have to manually identify a least disruptive change window, which can be time consuming and may not be very accurate.

Accordingly, there is a need for a method to automatically determine a change window of least impact that takes into account change window type, urgency, user preferences, as well as identifying risk(s) associated with a particular change window.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure relates generally to the field of computer networking, and more particularly to providing an intelligent change window planner within enterprise networks.

A method to perform the techniques described herein may be implemented by a controller and may include receiving, from a device within the network, data associated with an administrator, the data corresponding to implementing a change window; determining, by the controller and based at least in part on the data, one or more windows of least impact; determining, by the controller and based at least in part on the data, one or more risks associated with each of the one or more windows of least impact; and sending, to the device, a message for display, the message including the one or more windows of least impact and the one or more risks.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of service networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Enterprise networks generally use a change window concept, where an outage is communicated back to user(s) and an upgrade is planned. Network administrators may schedule a change window for a variety of reasons (e.g., software upgrade(s), configuration change(s) in the network, hardware update(s) in the network, etc.). Currently, change windows usually happen during weekends, holidays, late at night, etc., which require the network administrator to be present and/or online to implement the change window. However, change windows may not require a long period of time to implement, making these hours inconvenient.

Moreover, while current techniques (e.g., N+1 Hitless upgrade, Hotpatch, rolling access point (AP) upgrades etc.) focus on reducing the software update downtime in a network, network administrators still have to manually identify a least disruptive change window, which can be time consuming and may not be very accurate.

Accordingly, there is a need for a method to automatically determine a change window of least impact that takes into account change window type, urgency, user preferences, as well as identifying risk(s) associated with a particular change window.

This disclosure describes techniques and mechanisms for a system to determine a change window of least impact based on the type of activity, urgency, and preference, and highlighting risks/benefits of choosing a change window. In some examples, the system may receive, from a device within the network, data associated with an administrator, the data corresponding to implementing a change window. The system may determine, based at least in part on the data, one or more windows of least impact. In some examples, the system may determine, based at least in part on the data, one or more risks associated with each of the one or more windows of least impact and send, to the device, a message for display, the message including the one or more windows of least impact and the one or more risks.

In some examples, the system may comprise a change window planner. In some examples, the change window planner 106 corresponds to a system that has complete visibility into the security fabric of a given network (e.g., enterprise network, smaller network, etc.). In some examples, the change window planner may be integrated as part of Cisco's Digital Network Architecture (DNA) Center (DNAC). In some examples, the DNAC may comprise one or more pre-trained models and/or pre-trained weighted models. In some examples, the artificial intelligence models are pre-trained using machine learning techniques. In some examples, the change window system may store machine-trained data models for use during operation. Machine learning techniques include, but are not limited to supervised learning algorithms (e.g., artificial neural networks, Bayesian statistics, support vector machines, decision trees, classifiers, k-nearest neighbor, etc.), regression models, unsupervised learning algorithms (e.g., artificial neural networks, association rule learning, hierarchical clustering, cluster analysis, etc.), semi-supervised learning algorithms, deep learning algorithms, etc.), statistical models, etc. As used herein, the terms "machine learning," "machine-trained," and their equivalents, may refer to a computing model that can be optimized to accurately recreate certain outputs based on certain inputs.

In some examples, the pre-trained model may correspond to an artificial intelligence (AI) enhanced Radio Resource Management (RRM) engine (e.g., a RRM system). In some examples, the AI enhanced RRM system collects and collates various types of data (e.g., such as radio frequency conditions, such as channel load, client count per radio, etc., over multiple intervals.

In some examples, the AI enhanced RRM system may be augmented and/or utilized in a new way to predict an expected stress and/or load on each network device (e.g., each individual access point (AP) radio, each switch, each wireless LAN controller (WLC), etc.). Additionally, or alternatively, the change window planner may utilize the statistics about level 7 activity (e.g., which application is used, by which station, traffic characteristics and duration, etc.) as input into a machine trained model (e.g., such as a regression model), where the output indicates predicted application(s) that are most likely to be present at a particular time interval and/or what radio and/or device (e.g., medical device, network device, laptop, tablet, etc.). In some examples, the system may utilize a network Application Visibility and Control (AVC) configuration to label the predicted traffic. In some examples, the predicted traffic may be labeled based on a network Quality of Service (QoS) policy application classification (e.g., such as business critical application, business relevant application, etc.).

In this way, the system can automatically and intelligently identify change window(s) of least impact based on the type of upgrade to be performed, thereby minimizing the risk of disruption for the users and minimizing the need for administrators to guess what time windows would work best. Moreover, the system may streamline change windows by automatically identifying change window options for an administrator based on the input provided and/or that best suits the administrator's preferences. Further, by enhancing a RRM system to provide risk(s) associated with each of the change windows of least impact, thereby enabling the system to provide more accurate and customized change window options to an administrator.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
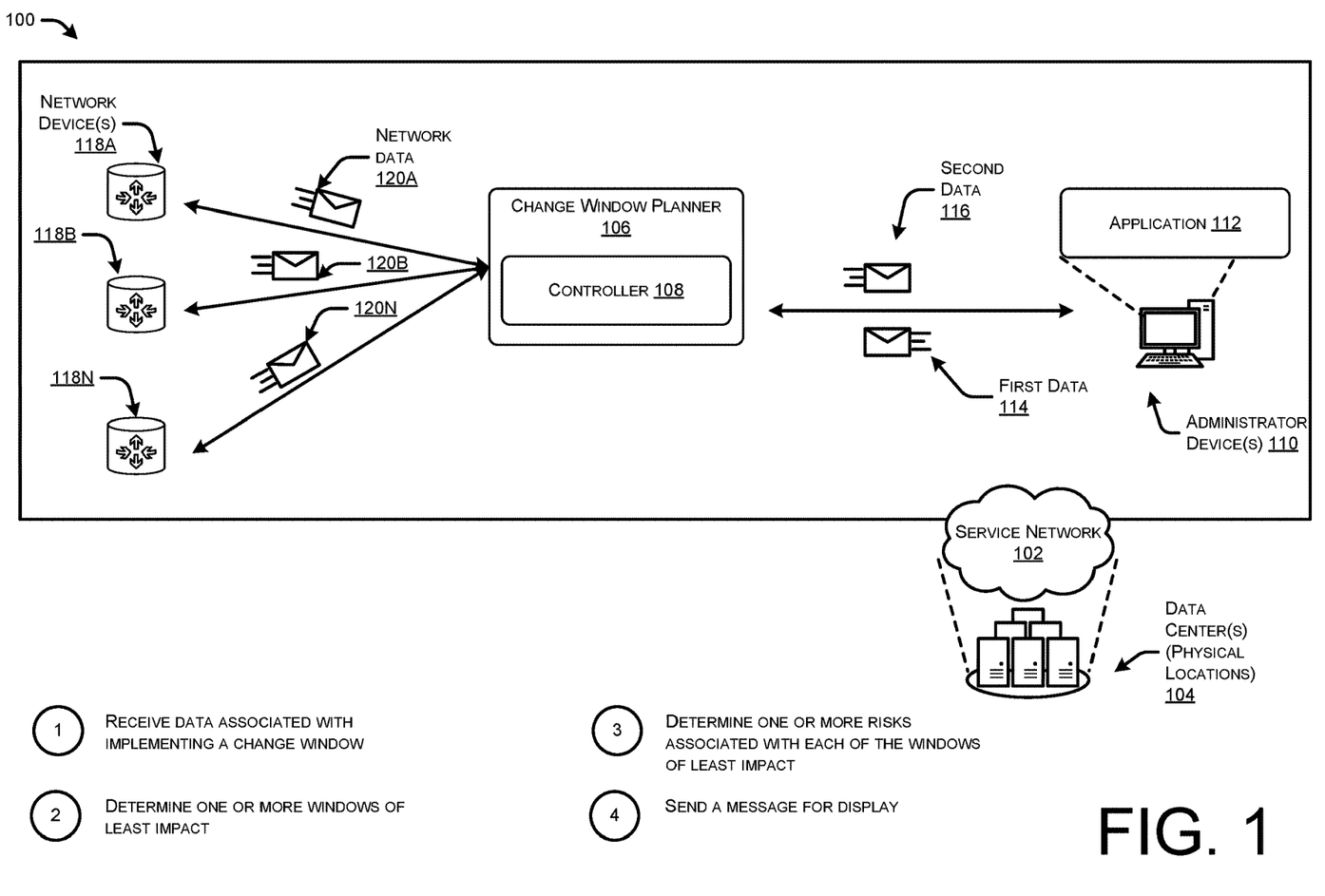
FIG. 1 illustrates a system-architecture diagram of an environment in which a system can identify windows of least impact within a network.

FIG. 1 illustrates a system-architecture diagram of an environment in which a system 100 can identify windows of least impact within a network.

In some examples, the system 100 may include a service network 102 that includes devices housed or located in one or more data centers 104. The service network 102 may include one or more networks implemented by any viable communication technology, such as wired and/or wireless modalities and/or technologies. The service network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The service network 102 may include devices, virtual resources, or other nodes that relay packets from one network segment to another by nodes in the computer network. The service network 102 may include multiple devices that utilize the network layer (and/or session layer, transport layer, etc.) in the OSI model for packet forwarding, and/or other layers.

The one or more data centers 104 may be physical facilities or buildings located across geographic areas that designated to store networked devices that are part of service network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based threat and compliance data provider needs. Generally, the data centers 104 (physical and/or virtual) may provide basic resources such as processor (CPU), memory (RAM), storage (disk), and networking (bandwidth). However, in some examples the devices in the packet-forwarding service networks 102 may not be located in explicitly defined data centers 104, but may be located in other locations or buildings.

The system 100 may comprise a change window planner 106. In some examples, the change window planner 106 corresponds to a system that has complete visibility into the security fabric of a given network (e.g., enterprise network, smaller network, etc.). In some examples, the change window planner may be integrated as part of Cisco's Digital Network Architecture (DNA) Center (DNAC). In some examples, the DNAC may comprise one or more pre-trained models and/or pre-trained weighted models. In some examples, the artificial intelligence models are pre-trained using machine learning techniques. In some examples, the change window system may store machine-trained data models for use during operation. Machine learning techniques include, but are not limited to supervised learning algorithms (e.g., artificial neural networks, Bayesian statistics, support vector machines, decision trees, classifiers, k-nearest neighbor, etc.), regression models, unsupervised learning algorithms (e.g., artificial neural networks, association rule learning, hierarchical clustering, cluster analysis, etc.), semi-supervised learning algorithms, deep learning algorithms, etc.), statistical models, etc. As used herein, the terms "machine learning," "machine-trained," and their equivalents, may refer to a computing model that can be optimized to accurately recreate certain outputs based on certain inputs.

In some examples, the pre-trained model may correspond to an artificial intelligence (AI) enhanced Random Registration Model (RRM) system. In some examples, the AI enhanced RRM system collects and collates various types of data (e.g., such as radio frequency conditions, such as channel load, client count per radio, etc., over multiple intervals.

In some examples, the change window planner 106 may comprise a controller 108. For instance, the controller 108 may be configured to communicate with an administrator device(s) 110 to receive data (e.g., threat data, compliance data, statistics about level 7 activity (e.g., which application is used, by which station, traffic characteristics and duration, etc.) and store the data as part of the system (e.g., such as in a database associated with the DNAC). As illustrated, the administrator device(s) 110 may comprise an application 112. In some examples, the application may correspond to an application provided by a service provider (e.g., such as Cisco) that enables an administrator of the network 102 to access the change window planner 106 and/or any other service(s).

In some examples, the AI enhanced RRM system may be augmented to predict an expected stress and/or load on each network device (e.g., each individual access point radio, each switch, each WLC, etc.). Additionally, or alternatively, the change window planner and/or controller 108 may utilize the statistics about level 7 activity (e.g., which application is used, by which station, traffic characteristics and duration, etc.) as input into a machine trained model (e.g., such as a regression model), where the output indicates predicted application(s) that are most likely to be present at a particular time interval and/or what radio and/or device (e.g., medical device, network device, laptop, tablet, etc.). In some examples, the system may utilize a network Application Visibility and Control (AVC) configuration to label the predicted traffic. In some examples, the predicted traffic may be labeled based on a network Quality of Service (QoS) policy application classification (e.g., such as business critical application, business relevant application, etc.).

In some examples, the change window planner 106 and/or controller 108 is configured to communicate data to and from the application 112 on the administrator device(s) 110. For instance, the change window planner 106 and/or controller 108 may receive first data 114 from the application and/or administrator device. The first data 114 may comprise input data including a change window type (e.g., upgrade WLC(s), upgrade AP(s), change network configuration(s), etc.), an indication of urgency associated with the change window (e.g., urgent, important, moderate, cosmetic, etc.), additional details and/or user preferences (e.g., avoiding late nights, avoiding weekends, avoid specific application traffic, or any other suitable preferences). The change window planner 106 and/or controller 108 may determine second data based at least in part on the first data. The second data may include one or more windows of least impact and/or one or more risks associated with each of the windows of least impact. The change window planner 106 and/or controller 108 may send the second data to the application 112 and/or administrator device(s) 110 for display.

The change window planner 106 and/or controller 108 may be configured to communicate with one or more network device(s) 118. For instance, as noted above the change window planner 106 and/or controller 108 may receive network data (e.g., network traffic load data, network client data, etc.) or other data (e.g., application load data, data associated with WLCs, APs, etc.) from the network device(s) 118. The network device(s) may comprise routers, switches, access points, stations, radios, or any other network device.

At "1", the system may receive data associated with implementing a change window. For instance, the change window planner 106 and/or controller 108 may receive a query indicating that a configuration window is needed. In some examples, the change window planner 106 may monitor code running on various network elements and/or network device(s). In this example, the change window planner 106 compare the code to a database to determine whether any of the code includes keyword(s) that match keyword(s) associated with bugs (or other security risks) that require an upgrade. In this example, the change window planner 106 may send a notification to the administrator device 110 indicating an upgrade and/or configuration change is needed and/or may request input from the administrator.

In some examples, the data may comprise input data. In some examples, the input data may comprise indication(s) of change window type, an urgency associated with the change window, additional details and user preferences, and/or additional settings.

At "2", the system may determine one or more windows of least impact. For instance, the change window planner 106 may utilize a machine trained model or other artificial intelligence algorithm. For instance, the input data may be provided as input into the artificial intelligence model and the output may identify one or more windows with the least impact on the service network 102 (e.g., window(s) of least impact). In some examples, a single window of least impact may be identified. In other examples, multiple windows of least impact may be identified. In some examples, the window(s) of least impact are based at least in part on the input data. In other examples, the window(s) of least impact may be based on a portion of the input data (e.g., such as change type and urgency, but not user preferences).

At "3", the system may determine one or more risks associated with each of the windows of least impact. For instance, in some examples, some disruption may occur to one or more network device(s) and/or network element(s) regardless of the window of least impact. The change window planner 106 may utilize a machine trained model or other artificial intelligence algorithm to identify risk(s) associated with each of the one or more windows of least impact. For instance, the change window planner 106 may identify one or more application(s) impacted for each window of least impact and/or a number of user(s) impacted.

At "4", the system may send a message for display. In some examples, the change window planner 106 may send the message to the administrator device(s) 110. For instance, the message may comprise the one or more windows of least impact and/or the risk(s) associated with each window of least impact.

In this way, the system can automatically and intelligently identify change window(s) of least impact based on the type of upgrade to be performed, thereby minimizing the risk of disruption for the users and minimizing the need for administrators to guess what time windows would work best. Moreover, the system may streamline change windows by automatically identifying change window options for an administrator based on the input provided and/or that best suits the administrator's preferences. Further, by enhancing a RRM system to provide risk(s) associated with each of the change windows of least impact, thereby enabling the system to provide more accurate and customized change window options to an administrator.

Figure 2:
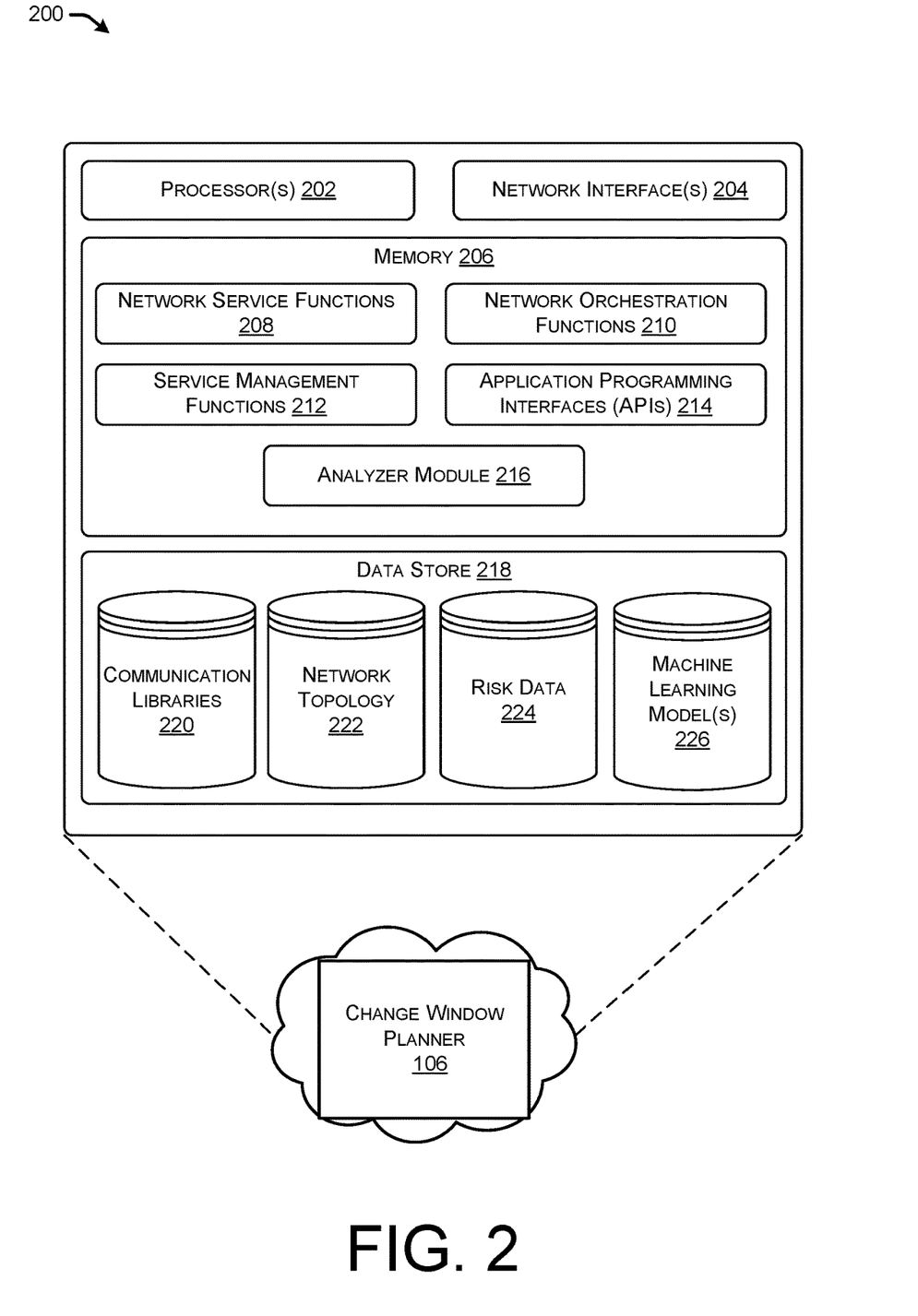
FIG. 2 illustrates a component diagram of an example change window planner described in FIG. 1.

FIG. 2 illustrates a component diagram of an example change window planner described in FIG. 1. In some instances, the change window planner 106 may run on one or more computing devices in, or associated with, the service network 102 (e.g., a single device or a system of devices). In some instances, the change window planner 106 may be integrated as part of a cloud-based management solution (e.g., such as Cisco's DNAC).

Generally, the change window planner 106 may include a programmable controller that manages some or all of the control plane activities of the service network 102, and manages or monitors the network state using one or more centralized control models.

As illustrated, the change window planner 106 may include, or run on, one or more hardware processors 202 (processors), one or more devices, configured to execute one or more stored instructions. The processor(s) 202 may comprise one or more cores. Further, the orchestration system 110 may include or be associated with (e.g., communicatively coupled to) one or more network interfaces 204 configured to provide communications with the edge device(s) 124 and other devices, and/or other systems or devices in the service network 102 and/or remote from the service network 102. The network interfaces 204 may include devices configured to couple to personal area networks (PANs), wired and wireless local area networks (LANs), wired and wireless wide area networks (WANs), and so forth. For example, the network interfaces 204 may include devices compatible with any networking protocol.

The change window planner 106 may also include memory 206, such as computer-readable media, that stores various executable components (e.g., software-based components, firmware-based components, etc.). The memory 206 may generally store components to implement functionality described herein as being performed by the orchestration system 110. The memory 206 may store one or more network service functions 208, such as a slicing manager, a topology manager to manage a topology of the service network 102, a host tracker to track what network components are hosting which programs or software, a switch manager to manage switches of the service network 102, a process manager, and/or any other type of function performed by the orchestration system 110.

The change window planner 106 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the service network 102 (configurable), and one or more APIs 214 for communicating with devices in the service network 102 and causing various control plane functions to occur.

Further, the change window planner 106 may include an analyzer module 216. In some examples, the analyzer module may run and/or perform back end artificial intelligence models. For instance, the analyzer module may access one or more artificial intelligence models (e.g., such as RRM system) and determine the one or more windows of least impact and/or risk(s). In some examples, the analyzer module 216 may train one or more of the artificial intelligence models. For instance, the analyzer module 216 may receive input from the administrator device 110 indicating that one or more of the windows of least impact are discarded and/or a reason for discarding the window(s)(e.g., such as application type impacted, user count, etc.). In this example, the analyzer module 216 may utilize reinforcement learning techniques to modify the weights associated with selecting window(s) of least impact. In this way, the analyzer module 216 may update the artificial intelligence model such that the system learns which conflicting criteria have more importance to the administrator of the network, thereby improving accuracy of the system and customizing the system to the network administrator.

The change window planner 106 may further include a data store 218, such as long-term storage, that stores communication libraries 220 for the different communication protocols that the change window planner 106 is configured to use or perform. Additionally, the data store 218 may include network topology data 222, such as a model representing the layout of the network components in the service network 102 and/or data indicating available bandwidth, available CPU, delay between nodes, computing capacity, processor architecture, processor type(s), etc. The data store 218 may store security policies 224 that includes security data associated with the network, security policies configured for the network, and/or compliance policies configured for the network. Additionally, the data store 218 may include risk data 224 received from the network device(s) 110 and/or network elements as described above and/or machine learning model(s) 226 as described above.

Figure 3A:
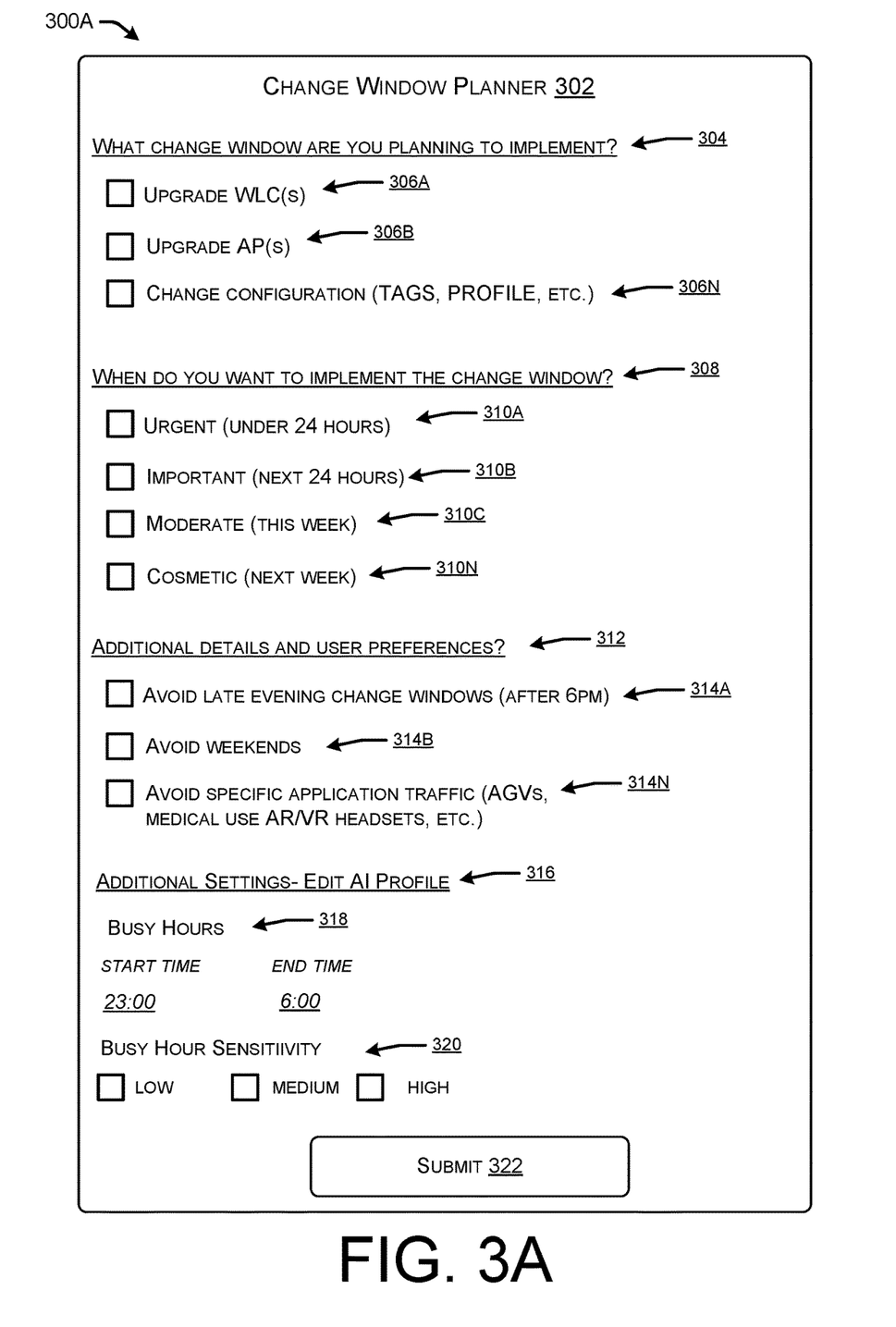
FIGS. 3A and 3B illustrate example user interfaces associated with the system described in FIGS. 1 and 2.

FIG. 3A illustrates an example user interface 300A associated with the system described in FIGS. 1 and 2. In some examples, the user interface 300A may be presented on an administrator device 110 via application 112. In some examples, the user interface may correspond to a dashboard for a service (e.g., such as Cisco's DNAC).

As illustrated in FIG. 3A, the user interface 300A may correspond to a change window planner 302. In some examples, the change window planner 302 is presented via the application 112 when the user accesses services provided by a service provider (e.g., Cisco's DNAC, the change window planner 106 described above, etc.).

The user interface 300A may include first text 304. As illustrated, the first text 304 may be associated with requesting a change window type (e.g., "What change window are you planning to implement?"). The user interface 300A may include one or more first selectable elements 306 associated with the change window type. In some examples, one or more of the first selectable elements 306 may be configurable by the administrator of the service network 102. For instance, the administrator may customize which first selectable elements 306 are displayed. In some examples, the first selectable elements 306 may be displayed in response to the administrator sending a query indicating a change window is needed. In some examples, one or more of the first selectable elements 306 may be displayed automatically and in response to the system monitoring code on the network device(s) 110 and/or network element(s). For instance, first selectable elements 306A and/or 306B may be displayed when an upgrade to WLC(s) and/or AP(s) are available. In some examples, one or more additional first selectable elements may be displayed.

In some examples, the system 100 may receive the administrator's selection of one of the first selectable elements 306 as input. The system may determine, based at least in part on the input, a time associated with implementing the change window type. For example, a selection of first selectable element 306A (e.g., "Upgrade WLC(s)") may correspond to a time frame of 2 hours, whereas a selection of first selectable element 306N (e.g., "Change configuration (TAGS, PROFILE, etc.)") may correspond to a time frame of 15 minutes. In some examples, the system may determine a time associated with the change window type based on an average time associated with past upgrade(s) and/or configuration change(s) of the same change window type.

The user interface 300A may include second text 308. As illustrated, the first text 304 may be associated with requesting an urgency associated with implementing the change window (e.g., "When do you want to implement the change window?"). The user interface 300A may include one or more second selectable elements 310 associated with the urgency of implementing the change window. In some examples, one or more of the second selectable elements 310 may be configurable by the administrator of the service network 102. In some examples, the second selectable elements 310 may be customized by the administrator. For instance, second selectable element 310A ("Urgent") may be customized to indicate the change window needs to be implemented in the next 12 hours, 24 hours, or any other suitable time window.

The user interface 300A may include third text 312. As illustrated, the third text 304 may be associated with requesting an urgency associated with user preferences (e.g., "Additional details and user preferences?"). The user interface 300A may include one or more third selectable elements 314 associated with user preferences. In some examples, one or more of the third selectable elements 314 may be configurable by the administrator of the service network 102, such that the administrator can customize the user preferences displayed on the user interface 300A.

In some examples, the user interface may include fourth text 316. As illustrated, the fourth text may be associated with additional configurable settings, such as settings to adjust an artificial intelligence model. In some examples, the user interface may include configurable settings 318. As illustrated, the administrator may input a start and end time associated with "busy hours." In this example, the system may use the input from the configurable settings to help determine what hours to avoid when determining a window of least impact. The user interface 300A may include fourth selectable elements 320. The fourth selectable elements may correspond to a sensitivity (e.g., low, medium, or high) that the administrator can select to indicate whether they want to have options for windows of least impact displayed during busy hours. For instance, busy hours may correspond to busy hours of the network. A "low" sensitivity may indicate that windows of least impact may be displayed during busy hours where the traffic load of the network is less than 70%. A "medium" sensitivity may indicate that windows of least impact may be displayed during busy hours where the traffic load of the network is less than 75%. A "high" sensitivity may indicate that windows of least impact may be displayed during busy hours where the traffic load of the network is less than 80%. IN some examples, the "low", "medium", and "high" sensitivity levels are configurable by the network administrator, such that the administrator can customize the sensitivity levels for the network.

In some examples, the fourth text 316, configurable settings 318, and/or fourth selectable elements 320 may not be included on user interface 300A. In this example, the fourth text 316, configurable settings 318, and/or fourth selectable elements 320 may be included as part of a separate user interface (not shown), such as part of a settings user interface offered through Cisco's DNAC (e.g., such settings associated with editing a RRM profile).

The user interface 300A may further include a submit option 322. For instance, the administrator may select the submit option 322 in order to submit the input data from the first selectable elements 306, second selectable elements 310, third selectable elements 314, and/or the fourth selectable elements 320. In some examples, the input data is submitted to the change window planner 106 described above, to determine one or more window(s) of least impact and/or risk(s). In some examples, the user interface 300A may not include the submit option 322. In this example, the input data may be sent to the change window planner 106, as the administrator selects one or more of the first selectable elements 306, second selectable elements 310, third selectable elements 314, and/or the fourth selectable elements 320.

Figure 3B:
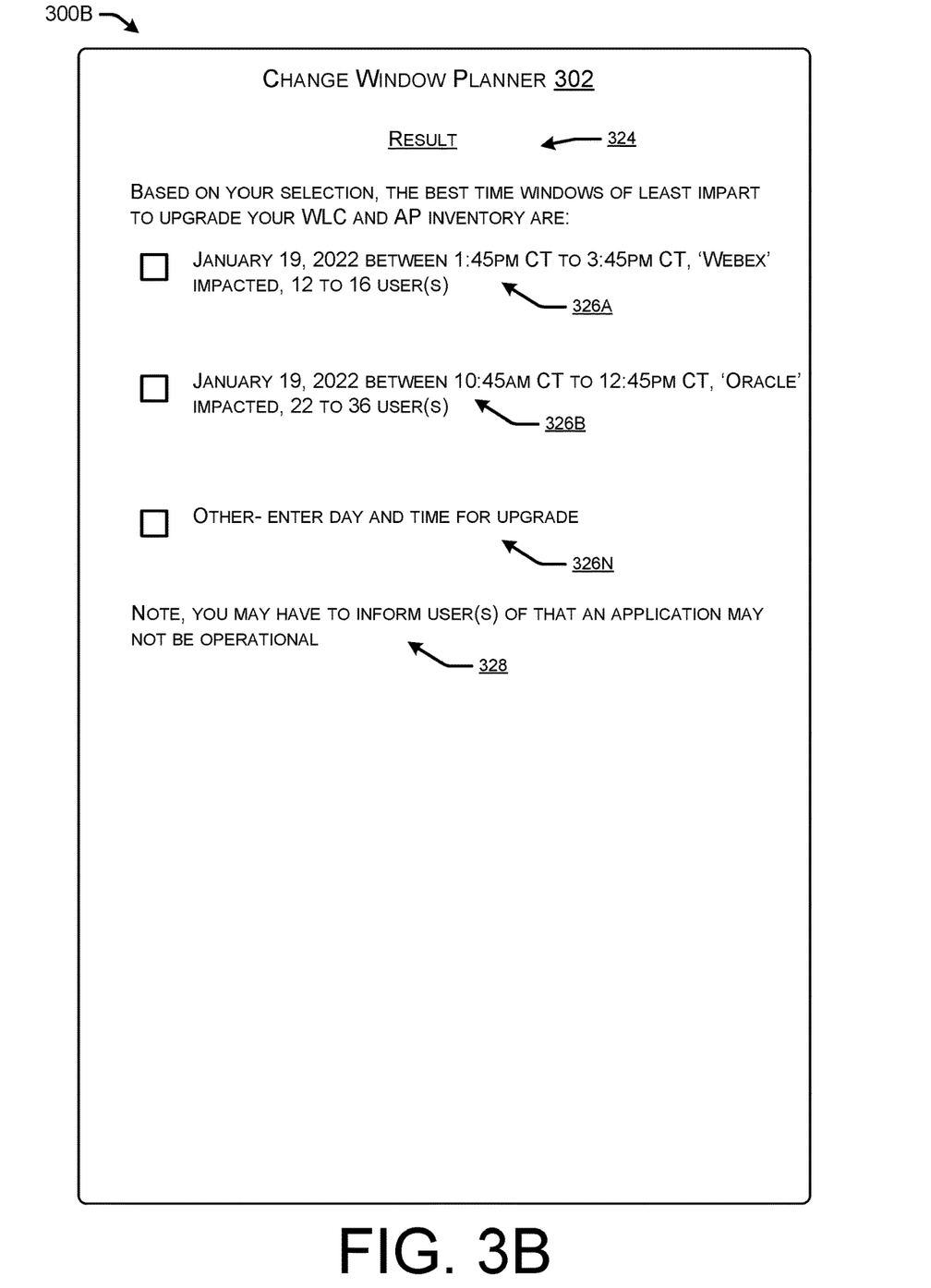

FIG. 3B illustrates an example user interface 300B associated with the system described in FIGS. 1 and 2. In some examples, the user interface 300B may be presented on an administrator device 110 via application 112. In some examples, the user interface 300B may be presented in response to an administrator selecting the submit option 322 on user interface 300A described above and/or in response to the administrator providing input to the user interface 300A, as described above.

As illustrated, user interface 300B may comprise fifth test 324 indicating a result associated with input provided by the administrator. For instance, user interface 300B includes change window option(s) 326. As illustrated, change window options 326A and 326B correspond to window(s) of least impact determined by the change window planner 106, as described above. For instance, as noted above, the windows of least impact may include indications of application(s) (e.g., "Oracle" and "Webex") that may be impacted by implemented the change window during a particular time period. Additionally, or alternatively, the windows of least impact may include indications of a number of users that may be impacted during a particular time window. In some examples, the windows of least impact 326A and 326B may include less information (e.g., such as only the proposed day and time) or additional information. Change window option 326N may correspond to a configurable option that enables the administrator to enter a day and time they would like the change window implemented.

User interface 300B may also include a note 328. As illustrated the note 328 may indicate that selection of one of the above change window option(s) 326 may require user(s) to be informed that an application may be impacted during the selected time period. In some examples, selection of one of the change window option(s) 326 may result in the system automatically starting the maintenance task associated with the selected change window option 326 and automatically notifying the user(s). In other examples, selection of one of the change window option(s) 326 may result in a notification to be displayed, asking the administrator whether they would like to notify the user(s). In this example, if the administrator confirms they would like to notify the user(s), the system may send the notification(s) to the identified user(s) and begin the maintenance task.

In some examples, the system may record data (e.g., update and/or configuration change, disruption time, applications impacted, network element(s) impacted, user(s) impacted, etc.) associated with the maintenance task and store the data in a maintenance task profile. In some examples, the data associated with the maintenance task and/or data from the maintenance task profile(s) may be used to re-train and/or update one or more of the machine learning models and/or artificial intelligence models.

Figure 4:
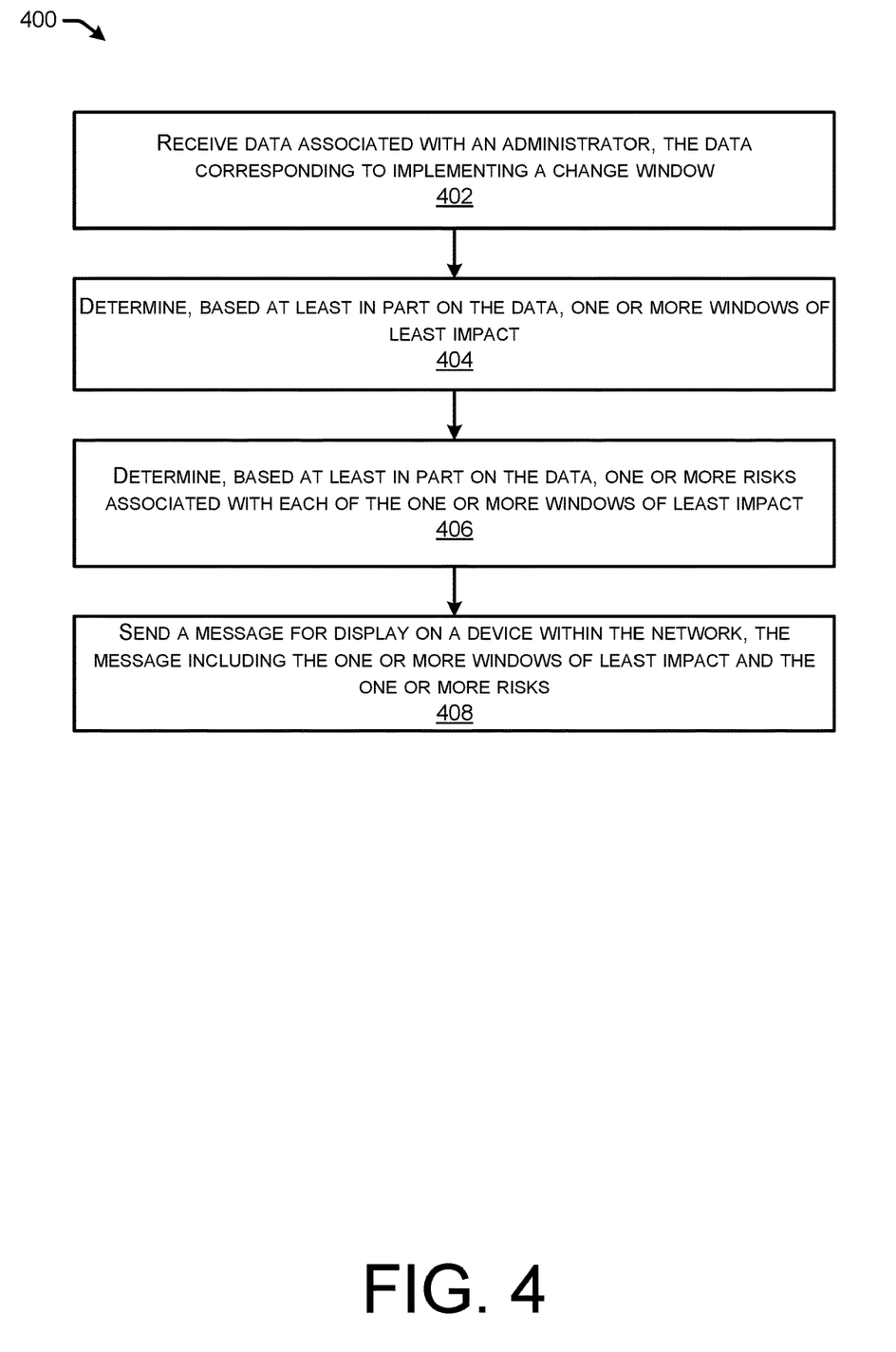
FIG. 4 illustrates a flow diagram of an example method for determining windows of least impact associated with the system described in FIGS. 1 and 2.

FIG. 4 illustrates a flow diagram of an example system 400 for determining windows of least impact. In some instances, the steps of system 400 may be performed by one or more devices (e.g., change window planner 106, controller 108, etc.) that include one or more processors and one or more non-transitory computer-readable media storing computer-executable instructions that, when executed by the one or more processors, cause the one or more processors to perform operations of system 400.

At 402, the system may receive, from a device within the network, data associated with an administrator, the data corresponding to implementing a change window. In some examples, the data may comprise a type of change associated with at least one element within the network, an urgency associated with the change window, and one or more user preferences.

In some examples, the system may monitor code running on one or more network elements. The system may identify keyword(s) associated with the code, the keywords indicating one or more bugs that require an upgrade. The system may send, to the device, an indication that the upgrade is required. In response to the notification, the system may receive the data from the device.

At 404, the system may determine, based at least in part on the data, one or more windows of least impact. In some examples, the one or more windows of least impact are further based at least in part on traffic load data, application traffic, and user data. In some examples, at least one of the one or more windows of least impact or the one or more risks are determined using one or more machine learning models and/or artificial intelligence models, such as the enhanced RRM system described above.

At 406, the system may determine, based at least in part on the data, one or more risks associated with each of the one or more windows of least impact. In some examples, the one or more risks correspond to one or more network elements (e.g., such as applications, etc.) impacted by a window of least impact of the one or more windows of least impact and a number of users impacted by the window of least impact.

At 408, the system may, send, to the device, a message for display, the message including the one or more windows of least impact and the one or more risks.

In some examples, the system may receive, from the device, an indication of a selection of a window of least impact of the one or more windows of least impact and may store the indication in a database associated with a service provider of the network, the indication being correlated with a user profile of the administrator and/or a maintenance profile associated with the administrator and/or network.

Figure 5:
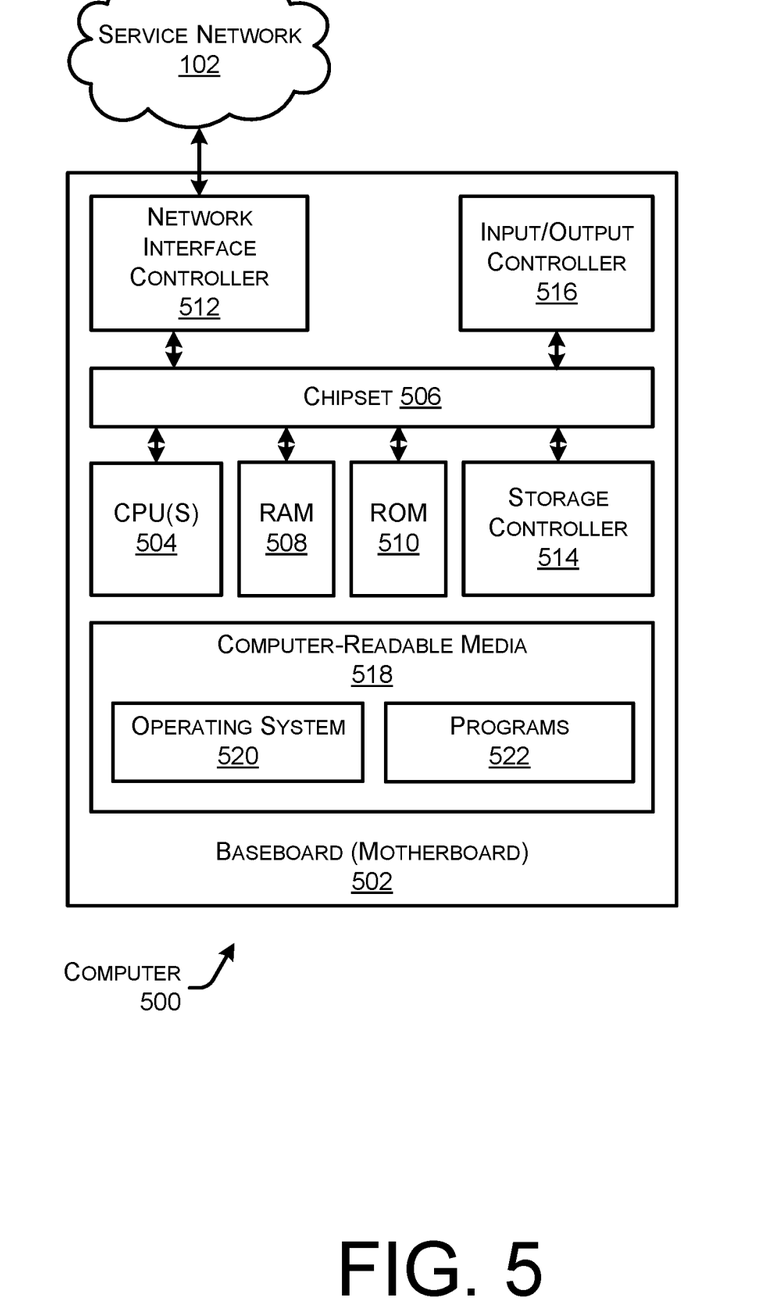
FIG. 5 is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a change window planner 106, a controller 108, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as service network 102. The chipset 506 can include functionality for providing network connectivity through a NIC 512, such as a gigabit Ethernet adapter. The NIC 512 is capable of connecting the computer 500 to other computing devices over the local network 108. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the change window planner 106, the controller 108, and/or any components included therein, may be supported by one or more devices similar to computer 500. Stated otherwise, some or all of the operations performed by the change window planner 106, the controller 108, and/or any components included therein, may be performed by one or more computer devices 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a change window planner 106, a controller 108, and/or any other device. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the centralized network security policy manager 108, the threat and compliance crawler 106, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for defining a "dynamic security compliance" model and architecture for dynamic networks that proactively prevent security policy violations, retroactively identifies security policy violations within a changing threat landscape, and provides auto-remediation of the security policies as necessary. For instance, the programs 522 may cause the computer 500 to perform techniques including: receiving, from a device within the network, data associated with an administrator, the data corresponding to implementing a change window, determining, based at least in part on the data, one or more windows of least impact, determining, based at least in part on the data, one or more risks associated with each of the one or more windows of least impact, and sending, to the device, a message for display, the message including the one or more windows of least impact and the one or more risks.

In this way, the system can automatically and intelligently identify change window(s) of least impact based on the type of upgrade to be performed, thereby minimizing the risk of disruption for the users and minimizing the need for administrators to guess what time windows would work best. Moreover, the system may streamline change windows by automatically identifying change window options for an administrator based on the input provided and/or that best suits the administrator's preferences. Further, by enhancing a RRM system to provide risk(s) associated with each of the change windows of least impact, thereby enabling the system to provide more accurate and customized change window options to an administrator.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented at least in part by a controller of a network, comprising:
   receiving, from a device within the network, data input by a network administrator, the data corresponding to implementing a change window and comprising an urgency associated with the change window and one or more user preferences of the network administrator associated with implementing the change window;
   determining, by the controller and based at least in part on the data, one or more windows of least impact;
   determining, by the controller and based at least in part on the data, one or more risks associated with implementing the change window during each of the one or more windows of least impact, the one or more risks including one or more applications impacted by each of the one or more windows of least impact and a number of users impacted by each of the one or more windows of least impact; and
   sending, to the device, a message for display to the network administrator, the message including the one or more windows of least impact and the one or more risks associated with each window of least impact of the one or more windows of least impact and enabling the network administrator to provide input selecting a window of least impact.

2. The method of claim 1, further comprising:
   monitoring, by the controller, code running on one or more network elements;
   identifying, by the controller, keywords associated with the code, the keywords indicating one or more bugs that require an upgrade; and
   sending, to the device, an indication that the upgrade is required.

3. The method of claim 1, wherein the one or more risks further include one or more of:
   an indication to notify the number of users.

4. The method of claim 1, wherein the one or more windows of least impact are further based at least in part on traffic load data, application traffic, and user data.

5. The method of claim 1, wherein at least one of the one or more windows of least impact or the one or more risks are determined using one or more machine learning models.

6. The method of claim 1, further comprising:
   receiving, by the controller and from the device, an indication of a selection of a window of least impact of the one or more windows of least impact; and storing, by the controller, the indication in a database associated with a service provider of the network, the indication being correlated with a user profile of the network administrator.

7. The method of claim 1, wherein the one or more risks identify an application associated with a particular window of least impact, the method further comprising:
determining that the application corresponds to a priority application; and
refraining from including the particular window of least impact in the one or more windows of least impact.

8. A system comprising:
one or more processors; and
one or more non-transitory computer-readable media storing computer-executable instructions that, when executed by the one or more processors, cause the one or more processors to perform operations comprising:
receiving, from a device within a network, data input by a network administrator, the data corresponding to implementing a change window;
determining, based at least in part on the data, one or more windows of least impact;
determining, based at least in part on the data, one or more risks associated with each of the one or more windows of least impact, the one or more risks identifying an identifier of an application impacted by implementing the change window during a window of least impact of the one or more windows of least impact and a number of users impacted;
sending, to the device, a message for display, the message including the one or more windows of least impact, the identifier of the application, and the one or more risks associated with each of the one or more windows of least impact;
receiving, from the device, second data input by the network administrator, the second data indicating a selection of one of the one or more windows of least impact; and
implementing the change window based on the second data.

9. The system of claim 8, wherein the data comprises a type of change associated with at least one element within the network, an urgency associated with the change window, and one or more user preferences of the network administrator.

10. The system of claim 8, the operations further comprising:
monitoring code running on one or more network elements;
identifying keywords associated with the code, the keywords indicating one or more bugs that require an upgrade; and
sending, to the device, an indication that the upgrade is required.

11. The system of claim 8, wherein the one or more risks further identify the number of users impacted by the window of least impact, and wherein the message further comprises the number of users.

12. The system of claim 8, wherein the one or more windows of least impact are further based at least in part on traffic load data, application traffic, and user data.

13. The system of claim 8, wherein at least one of the one or more windows of least impact or the one or more risks are determined using one or more machine learning models.

14. The system of claim 8, the operations further comprising:
storing the indication in a database associated with a service provider of the network, the indication being correlated with a user profile.

15. One or more non-transitory computer-readable media storing computer-readable instructions that, when executed by one or more processors, cause the one or more processors to perform operations comprising:
receiving, from a device within a network, data input by a network administrator, the data corresponding to implementing a change window;
determining, based at least in part on the data, one or more windows of least impact;
determining, based at least in part on the data, one or more risks associated with implementing the change window during each of the one or more windows of least impact, the one or more risks including one or more applications impacted by each of the one or more windows of least impact and indications of users impacted by each of the one or more windows of least impact; and
sending, to the device, a message for display to the network administrator, the message including the one or more windows of least impact, the one or more applications, and the one or more risks and enabling the network administrator to select a window of least impact to implement the change window.

16. The one or more non-transitory computer-readable media of claim 15, wherein the data comprises a type of change associated with at least one element within the network, an urgency associated with the change window, and one or more user preferences of the network administrator.

17. The one or more non-transitory computer-readable media of claim 15, wherein the indications comprise a number of users impacted by each of the one or more windows of least impact, and wherein the message further includes the number of users.

18. The one or more non-transitory computer-readable media of claim 15, wherein the one or more windows of least impact are further based at least in part on traffic load data, application traffic, and user data.

19. The one or more non-transitory computer-readable media of claim 15, wherein at least one of the one or more windows of least impact or the one or more risks are determined using one or more machine learning models.

20. The one or more non-transitory computer-readable media of claim 15, the operations further comprising:
receiving, from the device, an indication of a selection of a window of least impact of the one or more windows of least impact; and
storing the indication in a database associated with a service provider of the network, the indication being correlated with a user profile.

* * * * *